(12) United States Patent
Ranjan

(10) Patent No.: US 11,445,257 B1
(45) Date of Patent: Sep. 13, 2022

(54) MANAGING AND DELIVERING USER-PROVIDED CONTENT THAT IS LINKED TO ON-DEMAND MEDIA CONTENT

(71) Applicant: SLING MEDIA PVT LTD, Bangaluru (IN)

(72) Inventor: Rashmi Ranjan, Marathahalli (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 17/451,555

(22) Filed: Oct. 20, 2021

(51) Int. Cl.
*H04N 21/472* (2011.01)
*H04N 21/4227* (2011.01)
*H04N 21/41* (2011.01)

(52) U.S. Cl.
CPC . *H04N 21/47217* (2013.01); *H04N 21/41265* (2020.08); *H04N 21/4227* (2013.01); *H04N 21/47202* (2013.01)

(58) Field of Classification Search
CPC ....... H04N 21/47217; H04N 21/41265; H04N 21/4227; H04N 21/47202
See application file for complete search history.

(56) References Cited

U.S. PATENT DOCUMENTS

| | | | |
|---|---|---|---|
| 2010/0057576 A1* | 3/2010 | Brodersen | H04N 21/47202 705/14.69 |
| 2013/0024758 A1* | 1/2013 | Darby | G06F 16/435 715/205 |
| 2013/0152139 A1* | 6/2013 | Davis | H04N 21/4227 725/61 |
| 2014/0082645 A1* | 3/2014 | Stern | H04N 21/4788 725/23 |
| 2020/0278991 A1* | 9/2020 | Canter | G06F 40/166 |
| 2022/0038784 A1* | 2/2022 | Roh | H04N 21/47202 |

* cited by examiner

*Primary Examiner* — Oschta I Montoya
(74) *Attorney, Agent, or Firm* — KW Law, LLP (57) ABSTRACT

A media content storage and delivery system, and related operating methods are presented here. A disclosed method of delivering user-provided content that is linked to on-demand media content involves: causing playback of on-demand media content at a first presentation device; receiving uploaded media content, wherein uploading of the uploaded media content is initiated during playback of the on-demand media content at the first presentation device; and linking the uploaded media content with the on-demand media content. After performing the linking, the method causes playback of the on-demand media content at a second presentation device, and causes playback of the uploaded media content after playback of the on-demand media content at the second presentation device, or after pausing playback of the on-demand media content at the second presentation device.

18 Claims, 8 Drawing Sheets

MANAGING AND DELIVERING USER-PROVIDED CONTENT THAT IS LINKED TO ON-DEMAND MEDIA CONTENT

TECHNICAL FIELD

Embodiments of the subject matter described herein relate generally to systems and methodologies for delivering content (such as video content) over a data communication network. More particularly, embodiments of the subject matter relate to a media content storage and delivery system that manages user-uploaded content and delivers such content in association with linked on-demand media content.

BACKGROUND

The prior art includes various media playback devices and media player applications designed to play digital media content (e.g., audio, video, or images). Client devices (such as mobile phones, portable computer devices, desktop computer devices, gaming devices, and medical devices) may include media player applications that can play streaming media content, locally stored or recorded media files, and/or media content stored on a tangible memory element such as flash memory, an optical disc, or the like. The presentation of video or audio content can also be supported by vehicle instrumentation panels, tools, system control panels, and the like.

Live video streaming services and video on demand (VOD) services allow viewers to obtain television programs, movies, sports, and other types of video content directly over the Internet or a similar network. Most VOD services maintain large libraries of video content to ensure an interesting variation of programming for their customers. For example, a streaming video service provider may offer a video program series that includes a number of episodes. Users can choose to watch one or more episodes at convenient times, "binge watch" many episodes in sequential order during one sitting, etc.

BRIEF SUMMARY

Disclosed herein is a method of delivering user-provided content that is linked to on-demand media content. An exemplary embodiment of the method involves: causing playback of on-demand media content at a first presentation device; receiving uploaded media content, wherein uploading of the uploaded media content is initiated during playback of the on-demand media content at the first presentation device; and linking the uploaded media content with the on-demand media content. After the linking, the method continues by causing playback of the on-demand media content at a second presentation device; and causing playback of the uploaded media content after playback of the on-demand media content at the second presentation device, or after pausing playback of the on-demand media content at the second presentation device.

A media content storage and delivery system is also disclosed herein. An exemplary embodiment of the system includes: a network interface to communicate data between the system and at least one client device, via at least one network data communication link; an input interface to receive media content for handling by the system; a storage architecture to store on-demand media content for on-demand playback via the at least one network data communication link, and to store user-provided content for distribution via the at least one network data communication link; at least one processor; and at least one processor-readable medium associated with the at least one processor, the at least one processor-readable medium storing processor-executable instructions configurable to be executed by the at least one processor to perform a method that includes the steps of: causing playback of on-demand media content at a first presentation device; receiving uploaded media content, wherein uploading of the uploaded media content is initiated during playback of the on-demand media content at the first presentation device; linking the uploaded media content with the on-demand media content; after the linking, causing playback of the on-demand media content at a second presentation device; and causing playback of the uploaded media content after playback of the on-demand media content at the second presentation device, or after pausing playback of the on-demand media content at the second presentation device.

Also disclosed herein is at least one non-transitory machine-readable storage medium having executable instructions stored thereon. The instructions are configurable to cause at least one processor to perform at least the following operations: causing playback of on-demand media content at a first presentation device; receiving uploaded media content, wherein uploading of the uploaded media content is initiated during playback of the on-demand media content at the first presentation device; linking the uploaded media content with the on-demand media content; after the linking, causing playback of the on-demand media content at a second presentation device; and causing playback of the uploaded media content after playback of the on-demand media content at the second presentation device, or after pausing playback of the on-demand media content at the second presentation device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, or the like, various elements of the systems and devices described herein are essentially the code segments or instructions that cause one or more processor devices to perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques and methodologies related to signal processing, data transmission and file uploading, signaling, network control, communication systems, video broadcasting systems, video storage, video encoding and decoding, video playback, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter presented here relates to certain features of a media content storage and delivery system (which may be realized as a video services system that supports on-demand playback of media content, such as a satellite video system, a cable video system, a streaming media system, or the like). More specifically, the disclosed subject matter relates to a feature that allows users or subscribers to upload media content while viewing on-demand media programming. User-uploaded content can be filtered, screened, categorized, and/or classified as desired. The user-uploaded content can be linked to or otherwise associated with the on-demand media content that was playing when the content was uploaded. Thereafter, the user-uploaded content can be played back (for viewing by the same user and/or by other users) when the linked on-demand content is delivered again. For example, user-uploaded content that might be interesting to viewers of a video program series can be automatically presented between episodes of the video program series. Related advertisements or marketing content may also be presented before and/or after presentation of user-uploaded media content.

A media player of the type described herein can be rendered and displayed on any suitably configured display. The display can be integrated with a host electronic device, or it can be a distinct component that communicates and cooperates with an electronic device. In certain embodiments, a display can be realized as a removable peripheral component that is compatible with a host electronic device. In yet other embodiments, the display can be implemented with a more complex system, tool, or instrument (such as a vehicle, a piece of manufacturing equipment, an appliance, or the like). In this regard, an electronic device having a display can be realized as any of the following devices, systems, or components, without limitation: a mobile telephone; a personal computer (in any form factor, including a desktop, a laptop, a handheld, etc.); a tablet computing device; a wearable computing device; a video game device or console; a digital media player device; a household appliance; a piece of home entertainment equipment; a medical device; a navigation device; an electronic toy or game; a vehicle instrument or instrument panel; a control panel of a piece of machinery, a tool, or the like; a digital camera or video camera; a musical instrument; or a remote control device. It should be appreciated that this list is not exhaustive, and it is not intended to limit the scope or application of the embodiments described herein.

Figure 1:
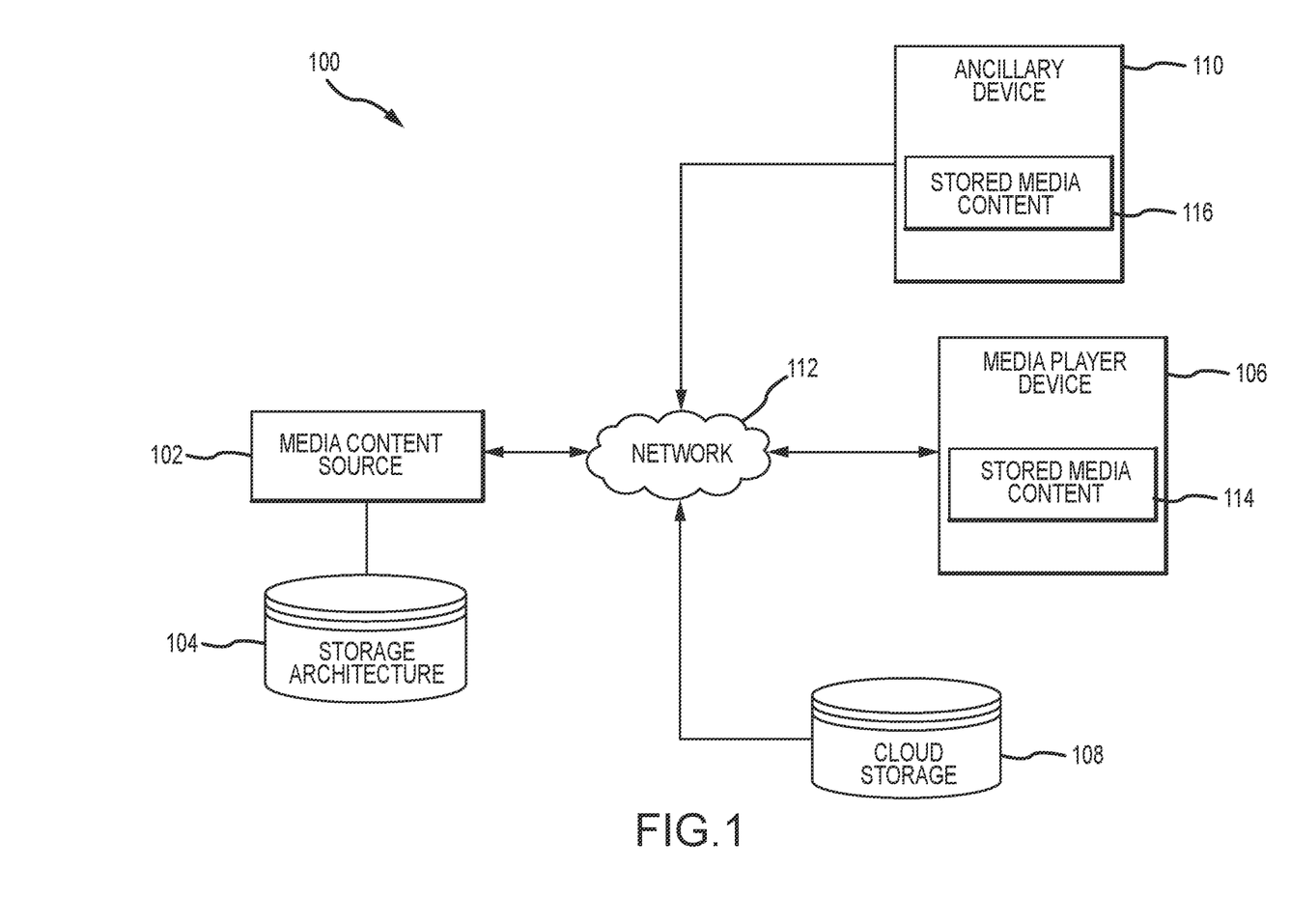
FIG. 1 is a simplified block diagram representation of an exemplary embodiment of a media content storage and delivery system.

Turning now to the drawings, FIG. 1 is a simplified block diagram representation of an exemplary embodiment of a media content storage and delivery system 100 that is suitably configured to support the techniques and methodologies described in more detail below. The system 100 (which has been simplified for purposes of illustration) generally includes, without limitation: at least one media content source 102 (referred to in the singular form herein for the sake of convenience); a storage architecture 104 coupled to or otherwise associated with the media content source 102; and an electronic device (e.g., a media player device 106 or other form of customer equipment that is capable of receiving, processing, and rendering media content). In some embodiments, the system 100 includes or cooperates with at least one cloud storage system 108 that supports the user of the media player device 106. In some embodiments, the system 100 includes or cooperates with at least one ancillary device 110 that supports the user of the media player device 106. In this regard, the media player device 106 and the ancillary device 110 may be owned or operated by one person.

The system 100 includes or cooperates with at least one data communication network 112 that facilitates communication between the various components, systems, and logic utilized by the system 100. For example, the data communication network 112 can be utilized for the communication of media content (e.g., recorded video content, live streaming video content, stored on-demand media content) from the media content source 102 to end user systems (such as the media player device 106) as needed. Moreover, the data communication network 112 can be utilized to upload media content from an originating device to the storage architecture 104, via the media content source 102 or via another data transmission path (not shown in FIG. 1).

The data communication network 112 is any digital or other communications network capable of transmitting messages between senders (e.g., the media content source 102) and receivers (e.g., the media player device 106). In various embodiments, the network 112 includes any number of public or private data connections, links or networks supporting any number of communications protocols. The network 112 may include the Internet, for example, or any other network based upon TCP/IP or other conventional protocols. In various embodiments, the network 112 also incorporates a wireless and/or wired telephone network, such as a cellular communications network for communicating with mobile phones, personal digital assistants, and/or the like. The network 112 may also incorporate any sort of wireless or wired local area networks, such as one or more IEEE 802.3 and/or IEEE 802.11 networks. In practice, the system 100 may cooperate with and leverage any number of wireless and any number of wired data communication networks maintained or operated by various entities and providers. Accordingly, communication between the various components of the system 100 may involve multiple network links and different data communication protocols. In this regard, the network 112 can include or cooperate with any of the following, without limitation: a local area network; a wide area network; the Internet; a personal area network; a near-field data communication link; a cellular communication network; a satellite communication network; a video services or television broadcasting network; a network onboard a vehicle; or the like. The components of the system 100 may be suitably configured to support a variety of wireless and wired data communication protocols, technologies, and techniques as needed for compatibility with the network 112.

The media content source 102 may be implemented with at least one server to provide hosted storage of on-demand media content and user-uploaded content for end users, and to distribute such content (e.g., on-demand and uploaded video content) to end users. Although only one media content source 102 is depicted in FIG. 1, an embodiment of the system 100 can include more than one media content source 102 to service different geographical regions, locales, time zones, or the like.

The media content source 102 may be deployed as a head end facility and/or a satellite uplink facility for the system 100. In some embodiments, the media content source 102 may include or cooperate with one or more web-based content delivery applications, services, or providers. The media content source 102 generally functions to control content, signaling data, programming information, and other data sent to any number of receiving components. The media content source 102 includes one or more data processing systems or architectures that are capable of producing signals that are transmitted to customer premise equipment, mobile devices, computer systems, or the like. In various embodiments, the media content source 102 represents a satellite, cable, cloud-based, or other content distribution center having suitably configured and deployed control system(s) for obtaining, accessing, managing, and/or communicating content, signaling information, blackout information, programming information, and other data.

The media content source 102 includes or cooperates with the storage architecture 104, which may be realized with one or more hardware components, memory storage devices (e.g., hard disk drives or solid state memory), database systems, or the like. The storage architecture 104 is configured, maintained, and operated to store on-demand media content for on-demand playback via at least one data communication link of the network 112, and to store user-provided content for distribution via at least one data communication link of the network 112. In practice, an embodiment of the media content source 102 may include or cooperate with any number of storage elements or databases as needed to store media content and uploaded content for the volume of end users or subscribers supported by the system 100.

An end user system (e.g., the media player device 106 or the ancillary device 110) may be realized in any number of different ways, and it may be suitably configured as needed to perform any number of desired functions, such as the presentation of audio content, video content, or audio-visual content. For example, an end user system may be implemented as any of the following, without limitation: a computing device; a video game device; a smartphone; a tablet device; an electronic medical device; a household or other electronic appliance; a digital media player device; a digital media place-shifting device; a television set; a set top box for a video services receiver; stereo or other entertainment equipment; an alarm clock; a wearable device; a vehicle entertainment system; or the like. These examples are not intended to limit or otherwise restrict the scope of the embodiments described herein.

The media player device 106 and the ancillary device 110 may be implemented as computer-based or processor-based electronic devices having appropriate supporting applications installed thereon. For example, a media player application supports the playback of media content, which can be provided by the media content source 102. Alternatively or additionally, the media player application supports the playback of stored media content 114, which can be locally stored at the media player device 106. Likewise, the ancillary device 110 may support the playback and/or uploading of stored media content 116, which can be locally stored at the ancillary device 110. As explained in more detail below, a user of the media player device 106 can upload content to the system 100 (for storage at an appropriate location, such as the storage architecture 104) while the media content source 102 delivers on-demand media content for playback at the media player device 106. The user-uploaded content may originate from the media player device 106 (e.g., as stored media content 114). Alternatively, some or all of the user-uploaded content may originate from the ancillary device 110 (e.g., as stored media content 116) and be uploaded in response to user interaction with the media player device 106 and/or the ancillary device 110. Alternatively, some or all of the user-uploaded content may originate from the cloud storage system 108 and be uploaded in response to user interaction with the media player device 106 and/or the ancillary device 110.

In accordance with certain embodiments, any of the hardware components shown in FIG. 1 can be implemented as a computer-based or a processor-based device, system, or piece of equipment. For example, the media player device 106 may be implemented as a computer-based or processor-based electronic device having an appropriate media player application installed thereon. The media player application supports the playback of media content, which can be provided by the media content source 102. Alternatively or additionally, the media player application supports the playback of stored media content 114, which can be locally stored at the media player device 106.

Figure 2:
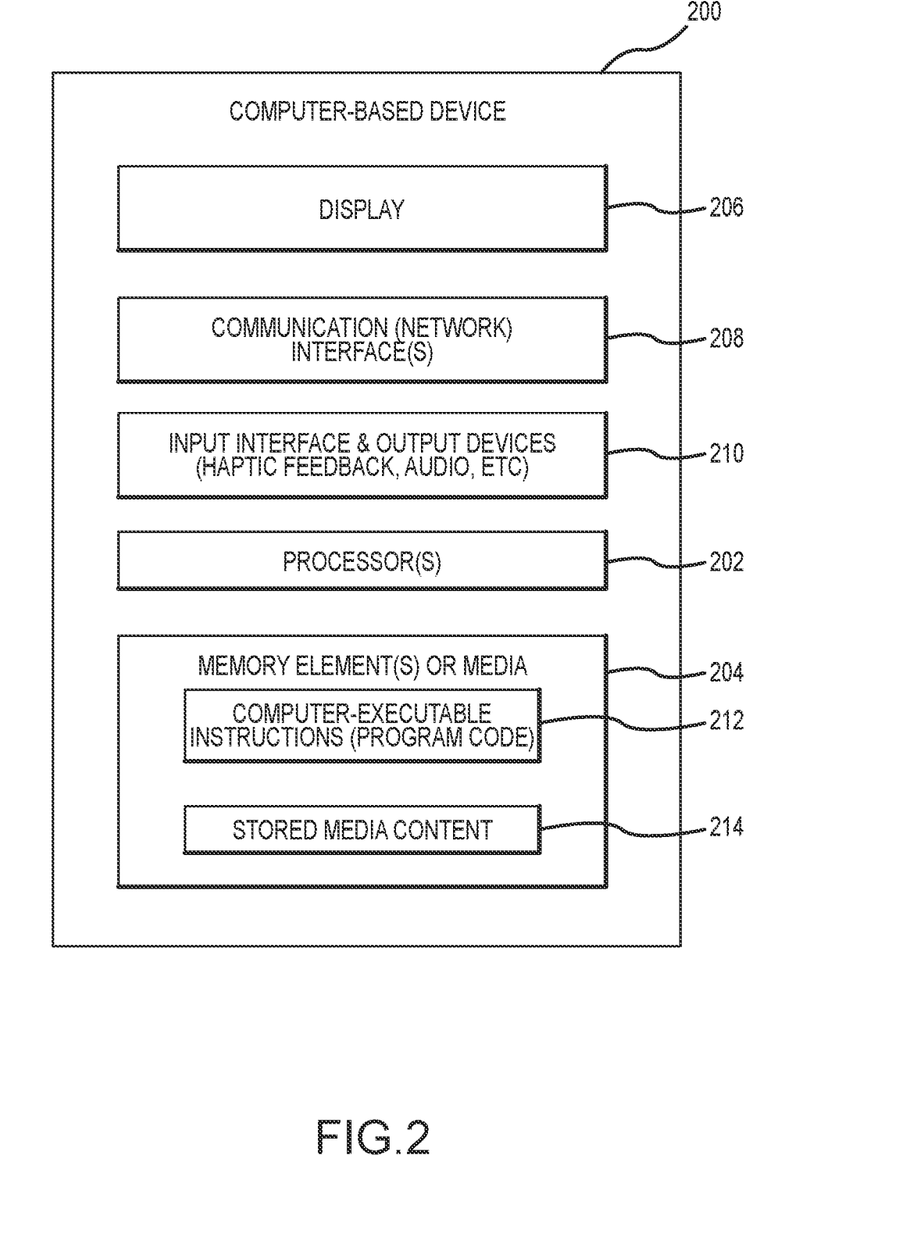
FIG. 2 is a simplified block diagram representation of an exemplary embodiment of a computer-based media player device.

FIG. 2 is a simplified block diagram representation of an exemplary embodiment of a computer-based device 200, which may be used to implement any of the devices or systems shown in FIG. 1. The device 200 generally includes, without limitation: at least one processor 202; at least one memory storage device, storage media, or memory element 204; a display 206; at least one communication (network) interface 208; and input and output (I/O) devices 210, such as an input interface, one or more output devices, one or more human/machine interface elements, or the like. In practice, the device 200 can include additional components, elements, and functionality that may be conventional in nature or unrelated to the particular media playback and content uploading functionality described here.

A processor 202 may be, for example, a central processing unit (CPU), a field programmable gate array (FPGA), a microcontroller, an application specific integrated circuit (ASIC), or any other logic device or combination thereof. One or more memory elements 204 are communicatively coupled to the at least one processor 202, and can be implemented with any combination of volatile and nonvolatile memory. The memory element 204 has non-transitory machine-readable and computer-executable instructions (program code) 212 stored thereon, wherein the instructions 212 are configurable to be executed by the at least one processor 202 as needed. When executed by the at least one processor 202, the instructions 212 cause the at least one processor 202 to perform the associated tasks, processes, and operations defined by the instructions 212. Of course, the memory element 204 may also include instructions associated with a file system of the host device 200 and instructions associated with other applications or programs. Moreover, the memory element 204 can serve as a data storage unit for the host device 200. For example, the memory element 204 can provide a storage buffer for images (e.g., video frame thumbnails, selected screenshots, or the like) and/or for video content that is presented by the device 200. In certain embodiments, the memory element 204 is used to maintain stored media content 214 that can be presented by the device 200.

The display 206 may be integrated with the device 200 or communicatively coupled to the device 200 as a peripheral or accessory component. The shape, size, resolution, and technology of the display 206 will be appropriate to the particular implementation of the device 200. The display 206 can be realized as a monitor, touchscreen, or another conventional electronic display that is capable of graphically presenting data and/or information provided by the device 200. The display 206 is communicatively coupled to the at least one processor 202, and it can leverage existing technology to detect touch gestures and contact with a user's finger (or fingers), a stylus, or the like.

The communication interface 208 represents the hardware, software, and processing logic that enables the device 200 to support data communication with other devices. In practice, the communication interface 208 can be suitably configured to support wireless and/or wired data communication protocols as appropriate to the particular embodiment. For example, if the device 200 is a smartphone, then the communication interface 208 can be designed to support a cellular communication protocol, a short-range wireless protocol (such as the BLUETOOTH communication protocol), and a WLAN protocol. As another example, if the device 200 is a desktop or laptop computer, then the communication interface can be designed to support the BLUETOOTH communication protocol, a WLAN protocol, and a LAN communication protocol (e.g., Ethernet). In practice, the communication interface 208 enables the device 200 to receive media content for presentation on the display 206, wherein the media content can be downloaded, streamed, or otherwise provided for playback or for storage at the device 200.

The I/O devices 210 enable the user of the device 200 to interact with the device 200 as needed. In practice, the I/O devices 210 may include, without limitation: an input interface to receive media content for handling by the device 200; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; or any conventional peripheral device. In this context, a touchscreen display 206 can be categorized as an I/O device 210. Moreover, a touchscreen display 206 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

This description assumes that an electronic device of the type described above can be operated to present media content to a user. The source, format, and resolution of the media content are unimportant for purposes of this description. Indeed, the data that conveys the media content can be locally stored at the electronic device, or it can be provided in an on-demand streaming media format from a content source, a service provider, a cloud-based entity, or the like. The following description assumes that the media player device 106 and its installed media player application can successfully and compatibly process, render, and display the desired media (video) content in an appropriate manner.

Figure 3:
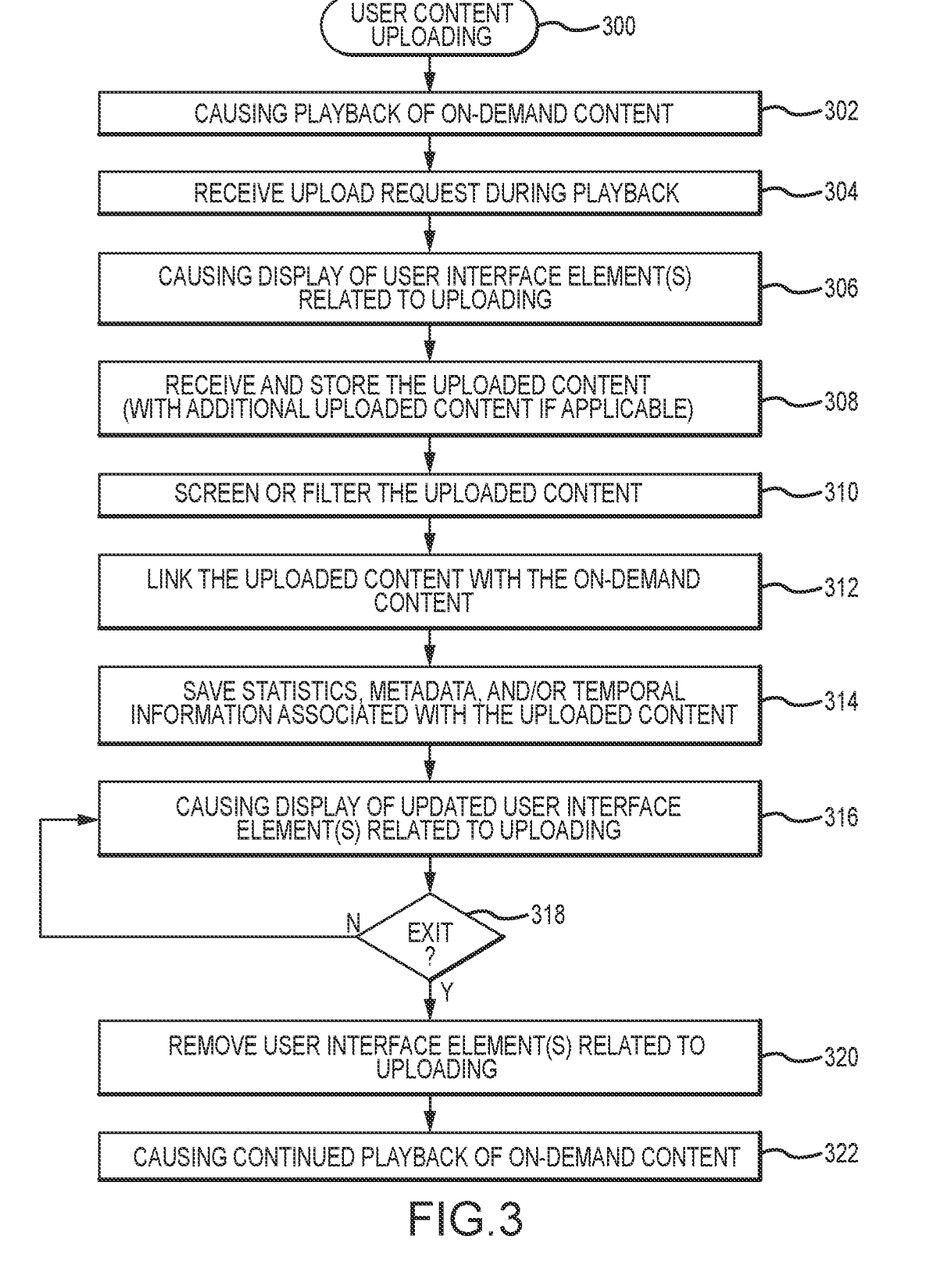
FIG. 3 is a flow chart that illustrates an exemplary embodiment of a process for obtaining and managing user-uploaded content.

FIG. 3 is a flow chart that illustrates an exemplary embodiment of a process 300 for obtaining and managing user-uploaded content. The process 300 represents an embodiment of a method of obtaining user-provided content that is linked to on-demand media content. The various tasks performed in connection with the process 300 may be performed by software, hardware, firmware, or any combination thereof. For illustrative purposes, the following description of the process 300 may refer to elements mentioned above in connection with FIG. 1 and FIG. 2. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The process 300 begins by controlling or otherwise causing the playback of on-demand media content at a presentation device (task 302). Task 302 may involve streaming or downloading the on-demand media content (which may be a video program, audio-only content, a presentation of still images, or the like) for rendering or presentation at a media player application, a media player software component, or the like. In the case of video content, task 302 results in the display or presentation of the video content on the display of the client presentation device.

Figure 4:
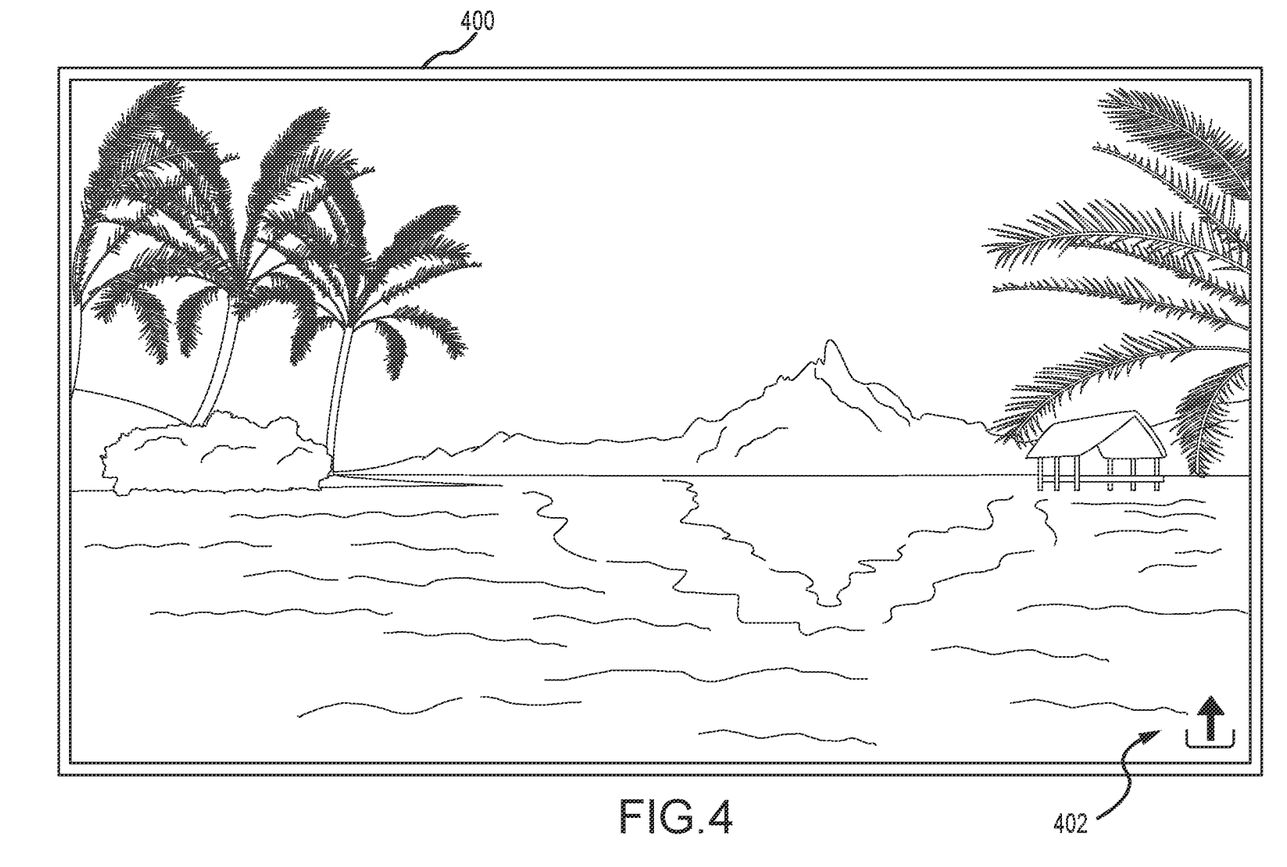
FIG. 4 is a screen shot of an exemplary media player, as captured during playback of on-demand content, with an upload button displayed thereon.

This example assumes that some type of detectable event, user interaction, command, or state/status of the host device triggers the display of an interactive upload control element on the display. In certain embodiments, this trigger event corresponds to some type of user interaction with the host device, including, without limitation: physical contact with a touchscreen display (a simple touch, a designated tapping pattern, a designated swipe pattern, etc.); a voice command; movement of the host device (such as a designated type of shaking or motion); a detectable facial appearance; a detectable eye blinking pattern; and/or a biometric scan (such as a fingerprint scan, a retina or iris scan, a palm print or palm vein scan, etc.). Alternatively or additionally, the trigger event corresponds to user interaction with a remote control device, a smartphone, or other remote device that is paired with or linked to the presentation device. For example, a remote device may include a devoted "upload" button or be programmed with a special key or key pattern that is assigned to an uploading feature. As another example, the trigger event may be associated with user interaction with the ancillary device 110, wherein such interaction results in the display of the interactive upload control element on the display of the host media player device (see FIG. 1). In this regard, FIG. 4 is a screen shot of an exemplary media player 400, as captured during playback of on-demand content. The media player 400 is controlled to display the interactive upload control element 402 (e.g., a graphically displayed button) with the displayed on-demand content. The interactive upload control element 402 is a graphical user interface (GUI) element that serves as a selectable user control item.

In certain embodiments, the interactive upload control element 402 is only temporarily displayed while the media content continues to play. For example, the upload control element 402 may automatically disappear after being displayed for a few seconds, 5 seconds, 10 seconds, or the like, unless it has been selected or touched. Accordingly, the upload control element 402 can appear when a touchscreen display is touched to enable the user to interact with the upload control element 402. However, if the user does not interact with the upload control element 402, then it is removed from the display while the media content continues to play.

This example assumes that some type of detectable event, user interaction, command, or state/status of the host device triggers the activation of the interactive upload control element 402. In certain embodiments, the interactive upload control element 402 responds to user selection, e.g., physical contact with the control element 402 when rendered on a touchscreen display, selection with a mouse or pointing device, or contact with a stylus or any object that can serve as a touchscreen input device. Selection of the control element 402 may generate or send an upload request from the host device, wherein the upload request initiates a content uploading routine. This example assumes that the process 300 receives a suitably formatted upload request during playback of the on-demand content (task 304) and, in response to the upload request, controls or causes the display of one or more user interface elements related to uploading (task 306).

Figure 5:
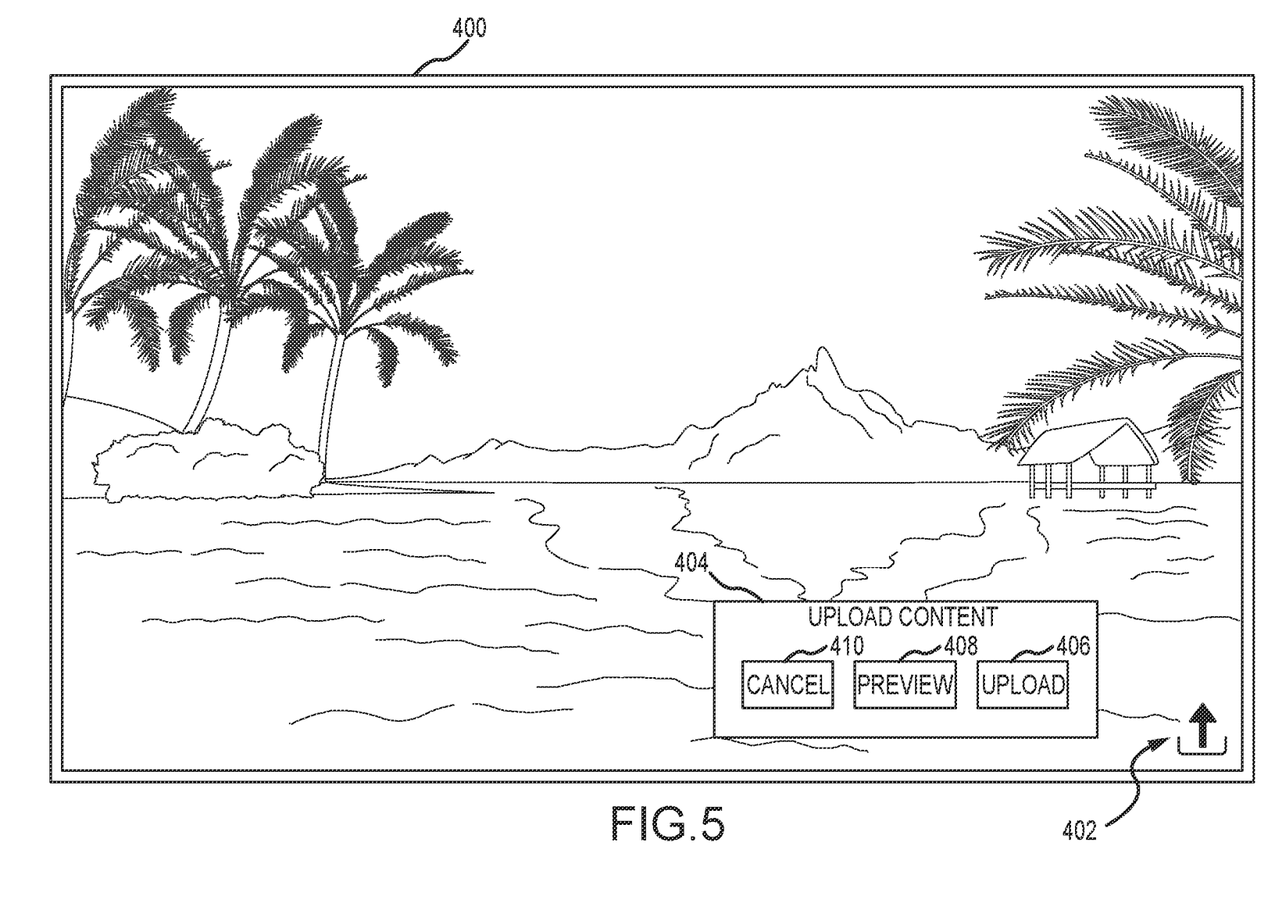
FIG. 5 is a screen shot of the media player shown in FIG. 4 after activation of the upload button, with a first graphical user interface menu displayed thereon.

FIG. 5 is a screen shot of the media player 400 after activation of the interactive upload control element 402. The media player 400 displays a user interface element 404 that includes one or more selectable buttons. The embodiment depicted in FIG. 5 includes, without limitation: an upload button 406; a preview button 408; and a cancel button 410. Additional or alternative buttons, controls, or fields may be rendered, as appropriate for the particular implementation, host device capabilities, user preferences, or the like. Selection or activation of the upload button 406 initiates a routine, task, process, or procedure to facilitate the selection and uploading of media content by the user. In this regard, activation of the upload button 406 may launch a window, an application, a component, or an operation that enables the user to browse files or media content, and select a file or an item of media content for uploading. Selection or activation of the preview button 408 initiates a routine, task, process, or procedure to preview selected media content prior to uploading. In this regard, activation of the preview button 408 may launch a window, an application, a component, or an operation that enables the user to browse files or media content, and select a file or an item of media content for previewing. Selection or activation of the cancel button 410 terminates the current operation and closes the user interface element 404. Selection or activation of the cancel button 410 may also terminate the display of the interactive upload control element 402.

In accordance with the exemplary embodiment described here, uploading of user-provided media content can be initiated via user interaction with the upload control element 402 and/or with the user interface element 404. To this end, uploading of user-selected media content may be initiated by the host presentation device (e.g., the device that renders the media player 400), by a remote control device that is linked to the host presentation device, and/or by an ancillary device that is associated with the host presentation device. In certain embodiments, activation of the upload button 406 rendered on one device can initiate the uploading of media content from a different device, system, or location. For example, selecting the upload button 406 on the host presentation device may launch a routine that allows the user to identify a linked or registered secondary device. The host presentation device may present a user interface component that displays a list of selectable content stored at the secondary device. Alternatively or additionally, the secondary device may launch a routine that allows the user to browse and select locally stored media content to be uploaded. Thus, the media content to be uploaded need not be stored locally at the presentation device that is currently being used for playback of the on-demand content.

Referring again to FIG. 3, this example assumes that the user has initiated the uploading procedure, and that at least one item of user-identified media content has been uploaded. This example also assumes that the process 300 receives the uploaded media content (task 308) and stores the uploaded media content with additional uploaded content, if applicable; the additional uploaded content may also be associated with or linked to the same on-demand media content that is currently being presented to the user. As mentioned previously, the uploaded media content may be received from the host presentation device, from an ancillary device that is associated with the host presentation device, and/or from a network-based or cloud-based storage device accessible by the user. Although the uploading of the media content is typically initiated during the playback of the on-demand media content at the host presentation device, the actual uploading and storing of the media content may occur while the on-demand media content is paused, or it may be delayed until playback of the on-demand media content is stopped, or it may be delayed until playback of the on-demand media content has ended.

End user agreements, subscriber contracts, and/or other terms and conditions may specify acceptable types or categories of content that can be uploaded or shared in the manner described herein. Alternatively or additionally, impermissible or prohibited types or categories of content can be defined or specified. For example, the process 300 may include one or more screening or filtering routines that can be applied to screen or filter the uploaded content (task 310) to ensure that there is sufficient or appropriate contextual relevance to the on-demand media content, to ensure that the uploaded content is acceptable, appropriate, or otherwise satisfies any applicable terms and conditions, or the like. To this end, task 310 may be a fully or partially automated task or it may involve human screeners. In this regard, an automated implementation may access and analyze metadata, content-defining tags, and/or other information that characterizes, categorizes, describes, or defines the subject matter of the uploaded media content.

This description assumes that the uploaded content is appropriate and acceptable (i.e., it passes the screening or filtering performed at task 310). Accordingly, the uploaded content can be saved in a way that links it or otherwise associates it with the on-demand media content (task 312). In certain embodiments, the process 300 saves, maintains, and updates statistics, metadata, and/or temporal information that is associated with the uploaded content (task 314). This additional information may include any or all of the following, without limitation: playback statistics of the uploaded media content (e.g., number of views, viewing timestamps, how often playback is skipped); upload timestamp; a playback time or time marker of the on-demand media content (e.g., the presentation time stamp) that indicates when the user initiated the content uploading routine; a playback time or time marker of the on-demand media content (e.g., the presentation time stamp) that indicates when actual uploading of the content has started and/or ended; program data or descriptive information corresponding to the on-demand media content.

Figure 6:
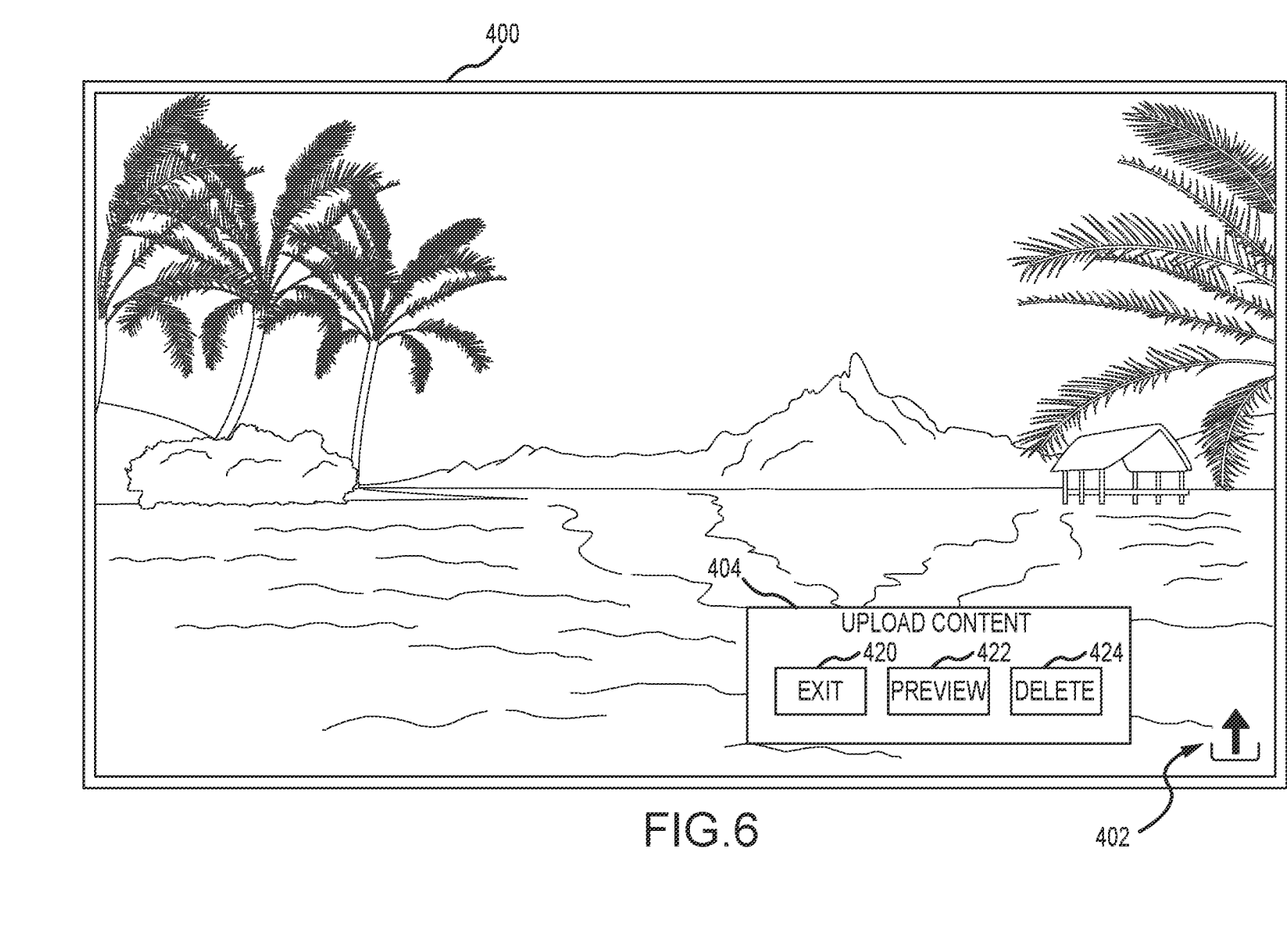
FIG. 6 is a screen shot of the media player shown in FIG. 4 after user content has been uploaded, with a second graphical user interface menu displayed thereon.

This description assumes that the user-selected media content is successfully uploaded and saved, with appropriate data associations. In certain embodiments, the process 300 continues by causing or controlling the display of an updated version of the user interface element 404. In this regard, FIG. 6 is a screen shot of the media player 400 after user content has been uploaded. The display is refreshed to show a version of the user interface element 404 that includes a different set of selectable buttons. The embodiment depicted in FIG. 6 includes, without limitation: an exit button 420; a preview button 422; and a delete button 424. Additional or alternative buttons, controls, or fields may be rendered, as appropriate for the particular implementation, host device capabilities, user preferences, or the like. Selection or activation of the exit button 420 terminates the current operation and closes the user interface element 404. Selection or activation of the exit button 420 may also terminate the display of the interactive upload control element 402. Selection or activation of the preview button 422 initiates a routine, task, process, or procedure to preview uploaded media content. In this regard, activation of the preview button 422 may launch a window, an application, a component, or an operation that initiates playback of the uploaded media content. Selection or activation of the delete button 424 initiates a routine, task, process, or procedure to delete the uploaded media content (with or without a confirmation screen, message, or warning). Selection or activation of the delete button 434 may close the user interface element 404 and/or terminate the display of the interactive upload control element 402.

In some implementations, the process 300 allows the user to upload additional content at this time by continued interaction with the user interface element 404 and/or the interactive upload control element 402. If the uploading routine is exited (the "Yes" branch of query task 318), then the user interface element 404 and the interactive upload control element 402 are removed from the display of the media player 400 (task 320). Moreover, the process 300 causes or controls the continued playback of the on-demand content (task 322). As mentioned above, playback of the on-demand content may proceed in an uninterrupted manner during the uploading routine. Alternatively, playback of the on-demand content may be paused after initiation of the uploading routine, and restarted thereafter. In this way, the process 300 enables the viewer to upload content that is relevant to the current on-demand programming, or content that might interest future viewers of the current on-demand programming. Uploaded user content can be stored and maintained for an indefinite period of time to accommodate presentation in connection with subsequent playback of the linked on-demand content.

Figure 7:
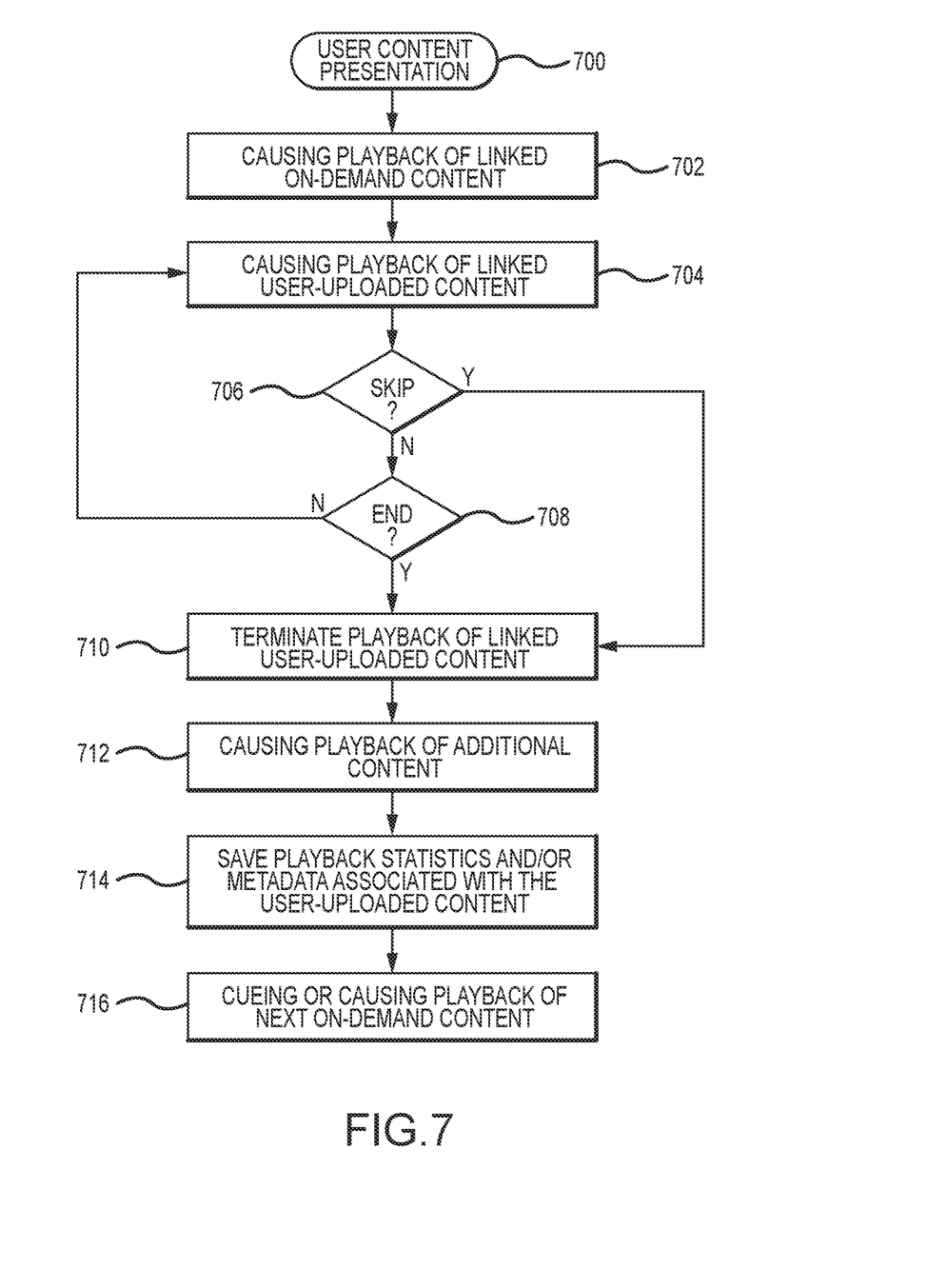
FIG. 7 is a flow chart that illustrates an exemplary embodiment of a process for presentation of user-uploaded content.

FIG. 7 is a flow chart that illustrates an exemplary embodiment of a process 700 for presentation of user-uploaded content. The various tasks performed in connection with the process 700 may be performed by software, hardware, firmware, or any combination thereof. For illustrative purposes, the following description of the process 700 may refer to elements, features, or operations mentioned above in connection with FIGS. 1-6. It should be appreciated that the process 700 may include any number of additional or alternative tasks, the tasks shown in FIG. 7 need not be performed in the illustrated order, and the process 700 may be incorporated into a more comprehensive procedure or process having additional functionality not described in detail herein. Moreover, one or more of the tasks shown in FIG. 7 could be omitted from an embodiment of the process 700 as long as the intended overall functionality remains intact.

The following description of the process 700 assumes that one or more items of user-uploaded media content have already been stored in association with (linked to) on-demand content. The uploaded media content that is linked to the on-demand content can be uploaded by any number of users, and playback of uploaded media content can be made available to any number of users, whether or not the viewing user uploaded any of the content. Accordingly, the process 700 begins after at least some uploaded media content has been linked with on-demand media content (as described above with reference to task 312 of the process 300).

The process 300 begins by causing or controlling playback of designated on-demand media content at a requesting presentation device (task 702). As mentioned above, the requested on-demand media content is already linked to at least one item of user-uploaded media content. At an appropriate time, the process 700 continues by causing or controlling playback of uploaded media content that is linked to the on-demand media content (task 704). Task 704 may be initiated after playback of the on-demand media content at the presentation device (e.g., playback has been terminated or stopped, or the on-demand media content has ended), or if playback of the on-demand media content has been paused at the presentation device. In certain embodiments, playback of the uploaded media content automatically begins immediately after the on-demand media content ends. In some embodiments, playback of the uploaded media content may follow interstitial content that is presented immediately after playback of the on-demand media content (e.g., one or more advertisements, promotional content, network-provided content, or the like).

The process 300 may support a skipping function that allows end users to skip or fast-forward through user-uploaded media content. To this end, the process 300 checks for receipt of a skip or fast-forward command (query task 706) during presentation of user-uploaded media content. If the process receives a skip command during playback of the uploaded media content (the "Yes" branch of query task 706), then the process 300 continues by terminating playback of the uploaded media content (task 708). Otherwise, playback of the uploaded media content continues. If playback of the uploaded media content has ended (the "Yes" branch of query task 708), then playback is terminated (task 710). Otherwise, playback of the uploaded media content continues.

After playback of uploaded media content, the process 300 may cause or control the playback of additional content (task 712). For example, the process 300 may initiate playback of another item of user-uploaded media content that is also linked with the on-demand media content, or initiate playback of interstitial content (an advertisement, a marketing segment, a network promotional piece, an intermission item, or the like).

For simplicity, this description assumes that one item of user-uploaded media content is played, i.e., no additional content is presented, and task 712 need not be performed. In certain embodiments, the process 300 continues (after terminating playback of the linked user-uploaded media content) by obtaining and saving playback statistics and/or metadata that might be associated with the recently presented user-uploaded media content (task 714). The playback statistics and/or metadata may include, for example: whether or not the user skipped the uploaded media content during playback; how much of the uploaded media content (if any) was viewed; play count for the uploaded media content (across all end users); and temporal information corresponding to the uploaded media content (such as playback time stamp data, calendar data, etc.). As explained in more detail below, at least some of the playback statistics and/or metadata can be used to select, prioritize, or order the playback of user-uploaded media content going forward.

The process 300 may continue by cueing or causing the playback of the next item of on-demand media content (task 716). In certain embodiments, the media player application may be configured to automatically play queued or designated content in a continuous manner with little to no user interaction. For example, if the viewer is watching an on-demand version of a video program series, then the various episodes of the series can be presented in sequential order, one after another. Accordingly, task 716 can automatically continue playback of a series following the presentation of user-uploaded media content and/or interstitial content. As another example, task 716 can initiate playback of another item of on-demand media content, such as a movie or program that includes the same actor(s) featured in the previous item of on-demand content, a recommended movie or program in the same genre or category as the last on-demand program, or the like, a newly released program, a promotional item, etc.

Figure 8:
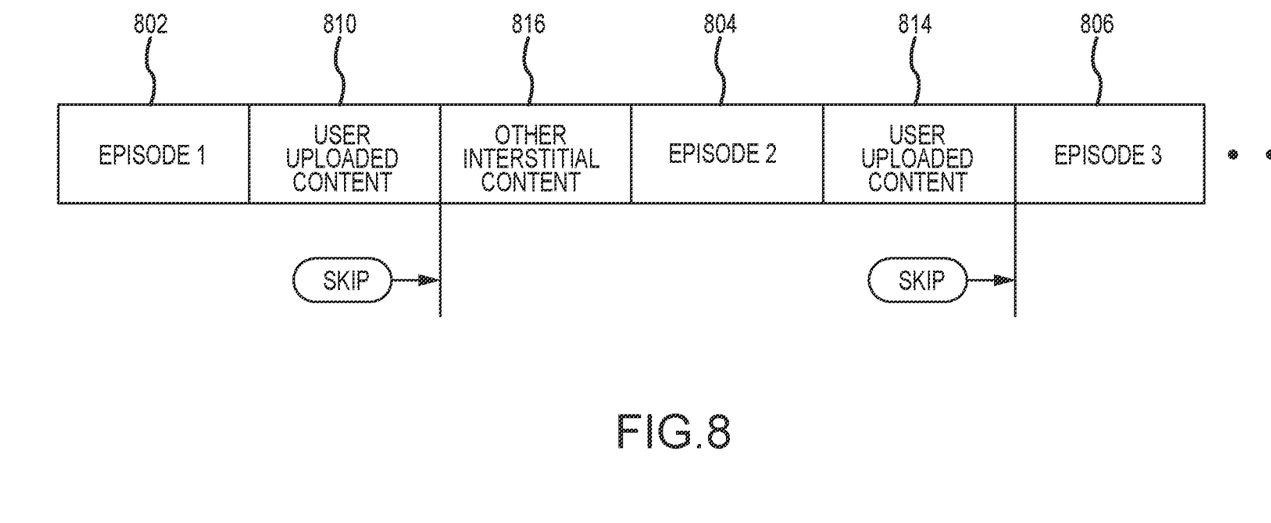
FIG. 8 is a diagram that depicts the presentation timing of on-demand video program episodes, user-uploaded content, and other interstitial content.

FIG. 8 is a diagram that depicts the presentation timing of on-demand video program episodes, user-uploaded content, and other interstitial content. FIG. 8 depicts a scenario where the on-demand media content includes a first episode 802 of a video program series, a second episode 804 of the video program series, and a third episode 806 of the video program series. FIG. 8 also depicts: a segment of user-uploaded content 810 presented between the first episode 802 and the second episode 804; a segment of user-uploaded content 814 presented between the second episode 804 and the third episode 806; and other interstitial content 816 presented between the first episode 802 and the second episode 804. More specifically, the interstitial content 816 appears after the segment of user-uploaded content 810 and before the second episode 804.

For the example shown in FIG. 8, the on-demand media content includes the first episode 802, and playback of the user-uploaded content 810 begins after completion of the first episode 802 and before playback of the next episode (i.e., the second episode 804). Similarly, playback of the user-uploaded content 814 begins after completion of the second episode 804 and before playback of the third episode 806. As schematically illustrated in FIG. 8, a skip command received during playback of the user-uploaded content 810 causes the media player device to skip until the end of the user-uploaded content 810. Consequently, presentation of the interstitial content 816 begins at that time. The system may be suitably configured such that certain types of interstitial content (e.g., advertisements) cannot be skipped. FIG. 8 also shows that a skip command received during playback of the user-uploaded content 814 causes the media player device to skip until the end of the user-uploaded content 814, i.e., the beginning of the third episode 806.

A segment of user-uploaded media content may include one or more distinct items of uploaded media content, wherein playback of the items of uploaded media content is controlled in a designated order that is determined based on the playback statistics of the uploaded media content and/or is determined based on the temporal information or data corresponding to the uploaded media content. For example, the segment of user-uploaded content 810 may include a plurality of distinct items (uploaded by one or more end users), and the playback order or selection of those items can be determined based on statistics that indicate popularity, number of views, frequency of skipping, likes or dislikes, status or popularity of the uploading user, etc. Additionally or alternatively, the playback order of those items can be determined based on temporal information, such as the upload date, the age of the content, the number of days or hours since the last playback of the uploaded content, etc.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of delivering user-provided content that is linked to on-demand media content, the method comprising:

causing playback of on-demand media content at a first presentation device, wherein the on-demand media content is an episode of a video program series;

receiving uploaded media content, wherein uploading of the uploaded media content is initiated during playback of the on-demand media content at the first presentation device;

linking the uploaded media content with the on-demand media content;

after the linking, causing playback of the on-demand media content at a second presentation device; and causing playback of the uploaded media content after playback of the on-demand media content at the second presentation device and before playback of a next episode of the video program series.

2. The method of claim 1, wherein uploading of the uploaded media content is initiated by the first presentation device.

3. The method of claim 1, wherein uploading of the uploaded media content is initiated by a remote control device that is linked to the first presentation device.

4. The method of claim 1, wherein uploading of the uploaded media content is initiated by an ancillary device that is associated with the first presentation device.

5. The method of claim 1, wherein the causing step causes playback of the uploaded media content to automatically begin immediately after playback of the on-demand media content.

6. The method of claim 1, further comprising:
screening the uploaded media content for contextual relevance to the on-demand media content.

7. The method of claim 1, further comprising the steps of:
receiving a skip command during playback of the uploaded media content; and
in response to receiving the skip command, terminating playback of the uploaded media content.

8. The method of claim 1, further comprising the step of storing additional uploaded media content linked to the on-demand media content, wherein the causing step causes playback of the uploaded media content and at least some of the additional uploaded media content.

9. The method of claim 8, wherein the causing step causes playback of the uploaded media content and at least some of the additional uploaded media content in a designated order that is determined based on playback statistics of the uploaded media content and playback statistics of the additional uploaded media content.

10. The method of claim 8, wherein the causing step causes playback of the uploaded media content and at least some of the additional uploaded media content in a designated order that is determined based on temporal information corresponding to the uploaded media content and temporal information corresponding to the additional uploaded media content.

11. A media content storage and delivery system comprising:
a network interface to communicate data between the system and at least one client device, via at least one network data communication link;
an input interface to receive media content for handling by the system;
a storage architecture to store on-demand media content for on-demand playback via the at least one network data communication link, and to store user-provided content for distribution via the at least one network data communication link;
at least one processor; and
at least one processor-readable medium associated with the at least one processor, the at least one processor-readable medium storing processor-executable instructions configurable to be executed by the at least one processor to perform a method comprising:
causing playback of on-demand media content at a first presentation device, wherein the on-demand media content is an episode of a video program series;
receiving uploaded media content, wherein uploading of the uploaded media content is initiated during playback of the on-demand media content at the first presentation device;
linking the uploaded media content with the on-demand media content;
after the linking, causing playback of the on-demand media content at a second presentation device; and
causing playback of the uploaded media content after playback of the on-demand media content at the second presentation device and before playback of a next episode of the video program series.

12. The system of claim 11, wherein the receiving step receives the uploaded media content from the first presentation device.

13. The system of claim 11, wherein the receiving step receives the uploaded media content from an ancillary device that is associated with the first presentation device.

14. The system of claim 11, wherein the method performed by the at least one processor further comprises:
screening the uploaded media content for contextual relevance to the on-demand media content.

15. The system of claim 11, wherein the method performed by the at least one processor further comprises:
receiving a skip command during playback of the uploaded media content; and
in response to receiving the skip command, terminating playback of the uploaded media content.

16. The system of claim 11, wherein:
the method performed by the at least one processor further comprises the step of storing additional uploaded media content linked to the on-demand media content; and
the causing step causes playback of the uploaded media content and at least some of the additional uploaded media content in a designated order that is determined based on playback statistics of the uploaded media content and playback statistics of the additional uploaded media content.

17. The system of claim 11, wherein:
the method performed by the at least one processor further comprises the step of storing additional uploaded media content linked to the on-demand media content; and
the causing step causes playback of the uploaded media content and at least some of the additional uploaded media content in a designated order that is determined based on temporal information corresponding to the uploaded media content and temporal information corresponding to the additional uploaded media content.

18. At least one non-transitory machine-readable storage medium having executable instructions stored thereon, the instructions configurable to cause at least one processor to perform operations comprising:
causing playback of on-demand media content at a first presentation device, wherein the on-demand media content is an episode of a video program series;
receiving uploaded media content, wherein uploading of the uploaded media content is initiated during playback of the on-demand media content at the first presentation device;
linking the uploaded media content with the on-demand media content;

after the linking, causing playback of the on-demand media content at a second presentation device; and
causing playback of the uploaded media content after playback of the on-demand media content at the second presentation device and before playback of a next episode of the video program series.

\* \* \* \* \*